United States Patent [19]

Hayner

[11] Patent Number: 4,950,880
[45] Date of Patent: Aug. 21, 1990

[54] SYNTHETIC APERTURE OPTICAL IMAGING SYSTEM

[75] Inventor: David A. Hayner, Arlington Heights, Ill.

[73] Assignee: Recon/Optical, Inc., Barrington, Ill.

[21] Appl. No.: 386,278

[22] Filed: Jul. 28, 1989

[51] Int. Cl.$^5$ .............................................. G01J 1/20
[52] U.S. Cl. .................................... 250/201.9; 356/5
[58] Field of Search ........................ 250/201 R; 356/5

[56] References Cited

U.S. PATENT DOCUMENTS

| 3,895,381 | 7/1975 | Kock | 345/5 |
| 4,011,445 | 3/1977 | O'Meara | 250/199 |
| 4,639,586 | 1/1987 | Fender et al. | 250/201 |
| 4,687,326 | 8/1987 | Corby | 356/5 |
| 4,707,128 | 11/1987 | Coles | 356/5 |

OTHER PUBLICATIONS

"Active Controlled Fiber Optical 90 Degree Hybrid for Coherent Communications," IEEE Photonics Technology Letters, vol. 1, No. 4, 4/89, authors Berenbrock et al.

"An Introduction to Synthetic-Aperture Radar," IEEE Spectrum, 9/69, authors Brown et al.

"Synthetic Aperture Radar," IEEE Transactions on Aerospace and Electronic Systems, vol. AES-3, No. 2, 3/67, author Brown.

"Image Reconstruction from Projections, The Fundamentals of Computerized Tomography," by G. T. Herman, Academic Press, 1980.

Primary Examiner—David C. Nelms
Assistant Examiner—Sherrie Hsia
Attorney, Agent, or Firm—Allegretti & Witcoff, Ltd.

[57] ABSTRACT

A distributed optical aperture imaging system for generating visual images with arbitrarily high angular resolutions. A large number of relatively small optical receiver modules are optically and electronically phased to synthesize a coherent collecting aperture. Each of the optical receivers performs localized figure measurement, figure control and the collection of optical energy from which the angle versus angle images are generated. These optical receivers generate quadrature measurement data of the reflected radiation field. From these quadrature measurements, either phase and/or magnitude information regarding the target structure can be derived and employed in image synthesis algorithms. The system employs either broadband, narrow band, single line or multi-line laser illuminators having an angular resolution of the order of the angular resolution of a single optical receiver element. Computationally intensive calculations may be performed on a distributed, parallel-processing basis within each receiver module for faster response, or on a centralized basis in a shared host processor to reduce the cost and complexity of the individual receiver modules.

29 Claims, 4 Drawing Sheets

FIG.5

| PIXEL | FREQUENCY CONTENT |
|---|---|
| $x_1, y_1$ | $fx_1 - fy_1, fx_1 + fy_1$ |
| $x_1, y_2$ | $fx_1 - fy_2, fx_1 + fy_2$ |
| $x_1, y_3$ | $fx_1 - fy_3, fx_1 + fy_3$ |
| $x_2, y_1$ | $fx_2 - fy_1, fx_2 + fy_1$ |
| $x_2, y_2$ | $fx_2 - fy_2, fx_2 + fy_2$ |
| $x_2, y_3$ | $fx_2 - fy_3, fx_2 + fy_3$ |
| $x_3, y_1$ | $fx_3 - fy_1, fx_3 + fy_1$ |
| $x_3, y_2$ | $fx_3 - fy_2, fx_3 + fy_2$ |
| $x_3, y_3$ | $fx_3 - fy_3, fx_3 + fy_3$ |

TABLE I: PIXEL AND FREQUENCY CONTENT

SYNTHETIC APERTURE OPTICAL IMAGING SYSTEM

BACKGROUND OF THE INVENTION

It is well known that the angular resolution of a conventional lens is proportional to the wavelength of the light collected, and is inversely proportional to the diameter of the lens. Assuming the wavelength of the light is 1.0 micrometer, and that an angular resolution of 10 nanoradians is desired, the lens would need to have a diameter of 100 meters, and would hence be impractically large to fabricate and/or transport or move by mechanical means.

The problem is similar in radar systems. The resolution provided by typical radar antennas is on the order of 0.1 radians but the resolution desired is on the order of 0.1 milliradians. However, the needed improvement (by a factor of 1000) can be achieved in radar systems by using various doppler beam sharpening techniques, or by the use of the synthetic aperture method. Synthetic Aperture Radar (SAR) synthesizes a large antenna by moving a single small antenna along a line. At many locations along this line, the small antenna transmits signals to the target and collects the reflected signals. SAR techniques for improving the angular resolution provided by a single antenna by many orders of magnitude are generally discussed in Brown, *Synthetic Aperture Radar*, IEEE Transactions on Aerospace and Elec. Systems, Vol. 3, No. 2, Mar., 1967 and in Brown, *An Introduction to Synthetic Aperture Radar*, IEEE Spectrum, Sept., 1967. Optical systems which directly parallel SAR systems have also been developed. Examples of optical systems employing SAR techniques are disclosed in U.S. Pat. No. 4,011,445 entitled "Optical Array Active Imaging Technique" and in U.S. Pat. No. 3,895,381 entitled "Synthetic Aperture Imaging Systems."

In conventional optical systems, improved resolution is normally pursued by carefully polishing the lens surface and increasing the focal length. If surface distortions are not to reduce the resolution of the lens even more from the inherent limits imposed by its limited diameter, then the surface must be accurately polished to within about one-tenth the wavelength of the light used. In a distributed aperture optical system, in which light from the target is captured by a two-dimensional array of smaller light receivers or reflectors, each forming a small portion of the area of an overall light receiving surface, an array of pistons may be employed to independently adjust the individual surfaces. U.S. Pat. No. 4,639,586 entitled "Optically Phased Laser Transmitter" describes a variation of this technique in which an array consisting of a small number of laser transmitters is optomechanically phased.

In prior distributed aperture optical systems, the need to position the optical surface with a precision of one-tenth the wavelength of the light, while still adjusting that position over a dynamic range of perhaps several centimeters in order to direct and focus the system, imposes an extremely stringent requirement. For a 1.0 micrometer wavelength, this corresponds to a dynamic range of approximately $10^6$.

An integral part of the "figure control" function of a distributed aperture optical imaging system is the calculation, from measurement data, of the adjustments needed to place the array of individual light receivers in coherence. This calculation needs to be performed continuously, and at a rate at least twice as high as the highest temporal frequency of the distortion inputs that can cause the system to fall out of alignment. Further, these corrections must be made at a spatial density sufficiently greater than the highest density of the spatial distortion functions present in the collection aperture. In prior art systems, both the measurement of the figure error and the processing required to generate the update information is computationally intensive and significantly limits the rate at which the update information can be generated. This in turn limits the quality of the obtained figure and affects the amount and types of disturbances that the figure control component of the system can handle. Further, the optical-mechanical actuators required to implement the figure control commands are highly complex, expensive, large and consume significant amounts of power to operate.

SUMMARY OF THE INVENTION

The present invention is an improved optical imaging system in which electro-magnetic energy is collected by an array of receivers, the received signals being optically and electronically recombined in order to synthesize the capabilities of a monolithic collection aperture in a manner providing capabilities not available with a monolithic aperture. The principles of the present invention provide substantially increased angular resolution, increased beam agility, significant reductions in the performance required of target illumination systems, and significant reductions in the complexity of the figure control and sensing systems needed to maintain a coherent optical system.

In accordance with the invention, the system employs a novel coherent optical receiver which provides quadrature measurements of the relative phase of the incident wavefront. One of these devices is employed at each of the receiver locations across the array. This coherent optical receiver performs all the functions associated with sensing the current optical figure, implementing corrections required to place the array of receivers in coherence and collecting the data from which an image is generated.

Each receiver in the array is controlled to place the array of receivers in coherent alignment and to steer and focus the array's lobe pattern into a specific location (e.g., two axis of freedom in angle and an additional degree of freedom in range). A laser illuminates the same region of space to which the receiver array's sensitivity lobe pattern is steered and focused. Each receiver samples an interval of the laser light reflected from the target and generates an electrical measurement representing the relative phase shift of the incident wavefront on a receiver-to-receiver basis. The two-dimensional array of receivers directly provides a two-dimensional complex measurement set. The measurement set is converted into a digital signal which is transferred to a signal processing unit which performs a two-dimensional Fourier inversion algorithm to recover an image of the target.

In accordance with a further feature of the invention, the array of receivers is maintained in coherence by receiving an external optical calibration signal or beacon having a known phase front structure to the array, collecting the resultant quadrature measurements generated by the individual receivers, and generating error data by comparing these measurements which each receiver's desired position. These error data, and information which specifies where the array's lobe structure is to be pointed and focused, is supplied to each individual optical receiver. Using this information, a correction factor is calculated for each array element, and that correction factor is supplied to electronically controlled optical phase shift devices in each of the individual optical receivers. In this way, the entire array of receivers can be placed in coherence and then steered and focused to an arbitrary point in three dimensions with very high accuracy and very high temporal bandwidths.

In accordance with a still further feature of the invention, monochromatic light is employed for illuminating the target. Since the light is nearly monochromatic after reflection from the target, the array need only be placed in coherence within a single 2 pi radian phase shift (that is, within one wavelength) in the direction of light travel. This is also true of the calibration signal or beacon which is also assumed to be monochromatic. As noted earlier, in order to generate a diffraction limited image from the array of receivers, each receiver must be aligned coherently to approximately one-tenth of the wavelength of the monochromatic light, but the range of control, or phase shift, required to implement corrective actions is also on the order of one wavelength, since further phase shifts yield measurements which simply repeat those in the adjacent wavelengths.

In accordance with still another feature of the invention, the laser source which illuminates the target may emit one of a sequence of several discrete, predetermined wavelengths for a specific period of time. After this period, the laser shifts to a new wavelength in the set of predetermined wavelengths and radiates for the same period of time at this new wavelength. The laser radiates at each of these wavelengths once and only once during this sequence. The diffraction pattern formed by the reflection of one of these discrete wavelengths from the target is temporally sampled to generate one complete set of spatial sample of the Fourier Transform. The diffraction pattern generated by the next pulse, which is at a slightly different wavelength, is similarly sampled in time but generates a slightly different sample of the Fourier Transform. By stepping through a predetermined set of wavelengths, Fourier domain data of greater density is produced from which a larger spatial domain image can be generated, that is, a larger field of view is generated.

These and other features and advantages of the invention may be more completely understood by considering the following detailed description of the invention.

BRIEF DESCRIPTION OF THE DRAWINGS

In the course of the description which follows, reference will frequently be made to the attached drawings, in which.

DESCRIPTION OF THE PREFERRED EMBODIMENT

The preferred embodiment of the invention to be described is a distributed aperture imaging system which includes means for electro-optically phasing an array of receivers in order to synthesize the performance of a large monolithic optical structure. The preferred embodiment utilizes the principles of the invention to remedy or alleviate several difficulties found in prior art systems, including the recovery of quadrature phase measurements of optical signals, the need to electronically steer and focus the system, the need to achieve a large field of view without requiring a large number of densely packed optical receivers, and the general need to reduce the bulk, complexity and cost of the electro-mechanical structures currently required in distributed aperture optical sensor systems.

Figure 1:
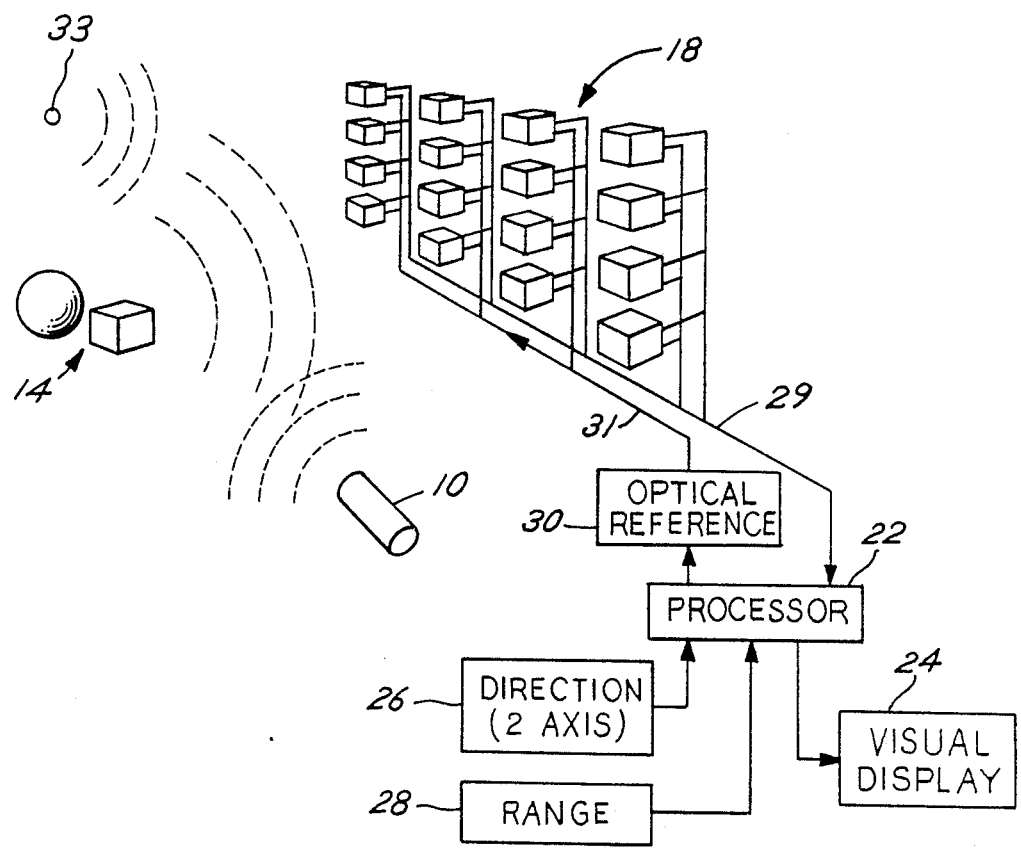
FIG. 1 graphically represents the overall organization of the optical imaging system contemplated by the invention.

The general organization of the preferred embodiment is depicted in FIG. 1 of the drawings. A laser 10 projects monochromatic light at a constant wavelength for a specific period of time, e.g., a microsecond, which illuminates a target 14. The reflected radiation is collected by an array of optical sensors or receivers 18 which generate data concerning the diffraction pattern of the target. These data are processed by a central processing unit 22 which executes a Fourier inversion algorithm to produce an image of the target on a visual display 24. The relative phase of the sensors in the array 18 is adjusted to steer and focus the sensitivity lobes of the receiver array in response to data giving the angular direction and distance to the target as supplied by the direction and range data sources 26 and 28 respectively as shown in FIG. 1. Laser 10 may be part of array 18 or may be located remotely from array 18 and coordinated with the operation of array 18 by communication links.

Information is exchanged between the individual receivers in array 18 and the central processor over a data bus 29. Each of the receivers in array 18 is supplied with an optical local oscillator signal from a single source 30 common to all receivers via an optical channel 31. An external optical calibration signal or beacon 33 is positioned to be simultaneously viewable by all receivers in the array.

The reflected radiation field containing the diffraction information has a characteristic which the present invention uses to advantage; specifically, it may be observed that the diffraction information contained in the reflected light at any sensor is contained in that light's relative phase and is invariant, from a given phase angle in one wavelength to the same phase angle in the next wavelength, over the coherence length of the laser illuminator. Phase shifts of an integral number of wavelengths in the direction of light travel thus do not affect the information content in the diffraction field. This implies that the effective position of the individual optical receivers may be shifted arbitrarily by an integral multiple of one wavelength without affecting the overall operation of the system.

The diffraction-limited performance of the system still requires that the overall system be coherent within approximately one-tenth of a wavelength, but the adjustment of the effective position of individual receivers need never exceed one wavelength because of the repetitive nature of the phase information. This reduces the dynamic range of the figure control and measurement system by several orders of magnitude.

The constraint imposed on large scale motion is limited by the coherence length of the laser. Since coherence lengths on the order of a meter are generally required in any laser illuminator (for a variety of other reasons), this simply requires that the full aperture support structure limits the unknown and uncontrolled positions of the optical receives to approximately one-tenth of those coherent lengths, (e.g., about one-tenth meter) in the direction of light travel over the full extent of the aperture. For a variety of reasons, any practical structure would restrict such motion to less than small fractions of a meter. As a result of the coherence length of the laser being substantially longer than a meter, and because of the repetitive nature of the phase information from wavelength to wavelength, electronically controlled phase shift elements with limited phase-shifting range can be successfully employed to implement the fine adjustments required to place the system in overall coherence. This property allows a significant reduction in the complexity of the resulting sampled aperture system.

Using the principles of the present invention, it is possible to implement the individual receivers using available, electronically-controllable optical phase shift devices capable of high speed, continuous shifts of wavelength. Such optical phase shift devices can be quite small and are relatively inexpensive to construct, yet are sufficiently robust that they may be used in large numbers with reliable results. These devices form the basis of the electronically controlled, fully integrated, inexpensive, small, rugged and robust optical receiver design, a preferred embodiment of which is illustrated in FIG. 2.

Figure 2:
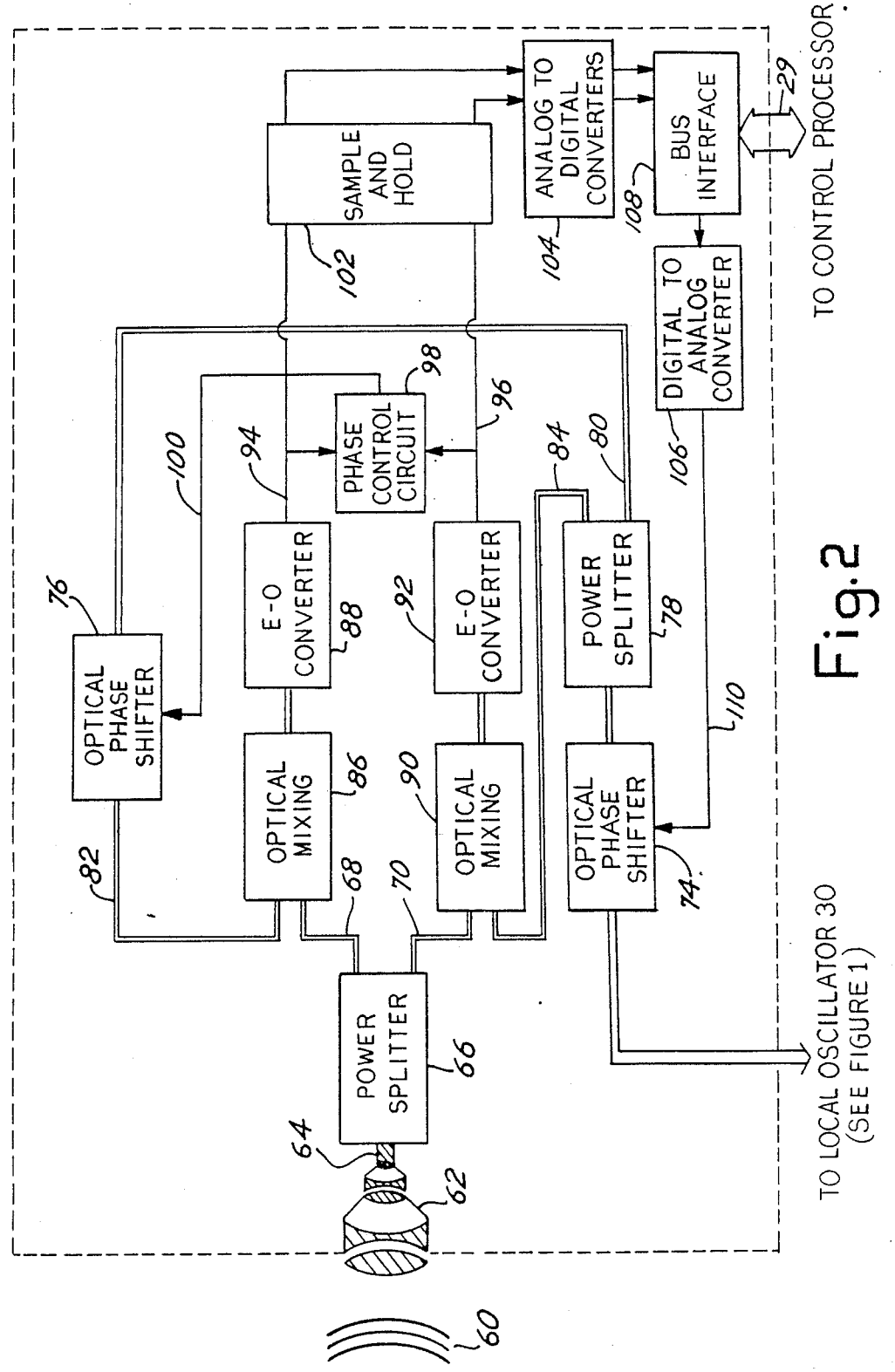
FIG. 2 is a block diagram of the novel optical receiver unit employed to implement the invention.

The optical receiver seen in FIG. 2 collects incident optical energy 60 by means of a lens 62 which is coupled via a light guide 64 to a power splitter 66. The power splitter 66 divides the power into two output channels 68 and 70.

Each of these two channels is mixed with phase shifted versions of an optical signal supplied by the local oscillator 30. This is the same local oscillator 30 shown in FIG. 1. The optical signal from oscillator 30 is supplied to the input of a first optical phase shifter 74 in each of the array receivers (the function of shifter 74 will be discussed below). The output signal from the phase shifter 74 is split into two channels by a second power splitter 78, one output channel 80 of which is connected to the input of a second optical phase shift device 76, whose function will also be discussed below.

The optical output channel 82 from phase shifter 76 and the output channel 68 from the first power splitter 66 are connected as inputs to a first optical mixing device 86 whose output channel conveys a baseband signal to the input of a first electro-optical converter 88. The converter 88 demodulates the baseband optical signal from the optical mixing device 86 into a first electrical quadrature signal on output conductor 94. In a similar fashion, the cascaded combination of an optical mixing device 90 and an electro-optical converter 92 combines the local oscillator signal on output channel 84 from the power splitter 78 with the received signal arriving via output channel 70 from the power splitter 66, to produce the demodulated electrical baseband signal on the output conductor 96 from electro-optical converter 92. The electrical signals on conductors 94 and 96 together provide quadrature signals indicating the relative phase of the optical signal 60.

An electronic phase control circuit 98 monitors the electrical output signals 94 and 96 and generates a first electrical control signal 100 which is applied to the optical phase shifter 76. The control circuit 98 and phase shifter 76 introduce sufficient optical phase shift to place the optical signals at the inputs to converters 88 and 92 ninety (90) degrees out of phase so that the two electrical signals 94 and 96 represent quadrature components from which the relative phase and magnitude of the received signal 60 can be determined.

The analog quadrature signals developed at the outputs of the electro-optical converters 88 and 92 are applied via conductors 94 and 96 to the input of sample and hold circuitry 102 which delivers samples (at a sampling rate at least twice the frequency of the maximum frequency of the quadrature signals) to analog-to-digital converters 104 which delivers digitized numerical values of the quadrature signals to the bus interface circuit 108. Bus interface circuit 108 is in turn connected to the bus 29, the communication highway to the central processor 22 seen in FIG. 1.

The optical and electrical components may be structured to achieve either a heterodyne or homodyne mode of operation. The details of design will necessarily vary depending on the mode selected. For example, if heterodyning is selected, sample and hold circuit 102 must be synchronized with local oscillator 30 for proper operation.

An electrical control signal 110 is generated by digital to analog converter circuit 106 in response to a numerical value stored in a data register (not shown) in the bus interface circuit 108. The control signal 110 is applied to the optical phase shifter 74 for making fine adjustments to the phase of the optical output signals from the phase shifter. Because of the repetitive nature of the phase information contained in the incoming optical signal discussed earlier, the phase shift device 74 needs only to have an adjustment range of approximately one (1) wavelength.

Phase shifting device 74 in FIG. 2 is used to perform the fine phase adjustment, on the order of one-tenth wavelength, required to maintain diffraction limited performance of the overall sampled optical aperture system. Each receiver contains an electrically controllable optical phase shifting element 74. Since the object of this phase shifting device is to adjust effective relative position of the receiver along the direction of light travel, the principal of reciprocity allows this optical phase shifter to be placed in either the received signal path 64 or in the path from the local oscillator 30. For a variety of practical reasons, it is placed in the local oscillator path. Some of these reasons include the relative amplitude of the signals in the signal path 64 and the signal from the local oscillator 30. Since the local oscillator signal can be easily forced to be substantially larger in amplitude than the received signal, and since the optical phase shift devices introduce some signal loss, maximum device sensitivity is obtained by placing the phase shift device 74 at the output of the local oscillator 30. Each of the optical receivers contain this electronically controllable optical phase shifting device. By electronically adjusting the phase shifter 74 by no more than one wavelength in each of the optical receivers, any arbitrary alignment of the optical receivers can be realized.

The bus architecture employed is determined primarily on the extent to which processing is done centrally in the processor 22, or on a parallel distributed basis in the local receivers. The present invention is particularly well suited for performing computational tasks which would burden conventional systems on a high speed, parallel basis, by placing a microprocessor at each receiver (as part of the bus interface circuit 108). Alternatively, the processing may be done on a wholly centralized basis such that only the final, desired phase information is transmitted to the individual receivers. In the latter case, the bus interface circuity need only comprise address decoding circuitry for detecting when information on the bus 29 is being sent to or requested from that particular receiver, an input data register for storing the desired phase correction (to be applied via D/A converter 106 to shifter 74, and a output data registers for storing the quadrature signal values developed by the A/D converters 104. Addresses and data may be multiplexed over the same wires, if desired, to reduce the size of the bus at the expense of bandwidth.

Aligning the array of optical receivers involves both (1) figure control and (2) beam steering. Figure control will be discussed first.

In order to place the array of optical receivers in coherent alignment to support diffraction limited imaging, some reference is required against which the receivers can measure their position and effect an adjustment that will cause a specific alignment to be achieved. In prior systems, this is accomplished through the use of an external source that provides a specific and well known phase front structure to the figure measurement system. This external source may be a dedicated beacon or a reflection from a target with a known structure [see, for example, O'Meara, U.S. Pat. No. 4,011,445]. It will accordingly be assumed that an external reference will be used for generating the signal against which all the receivers in the array can effect alignment.

In prior systems, after measurements are taken to ascertain the current position of all the elements in the optical system, a complex and highly computationally intensive mathematical process is performed on these data to determine the specific adjustments necessary that each of the optical devices must perform in order to place the complete system in coherence. Using the principles of the present invention, a very simple technique may be employed for performing these coherence adjustment calculations, taking advantage of the observation that the phase information is repetitive, wavelength to wavelength, in the direction of light travel, and the impact of that observation on the position control of the optical receivers.

In accordance with this aspect of the invention, an arbitrary optical sensor in the array is selected as the master or reference sensor. All of the remaining sensors in the array are slaved to the position of the master sensor. This reference sensor (or the central processor, depending on the extent to which such functions are distributed or centralized) selects an arbitrary phase position in the reference wavefront. This position is distributed in parallel (via the data transfer bus 29) as a phase reference value to all of the slave optical sensors. In a distributed system, each slave optical sensor has information concerning its x,y position in the array relative to the reference sensor and is provided with the reference value from the reference sensor (via bus 29) regarding its desired relative position for a desired figure for the overall aperture structure. Each slave sensor may then calculate the error between the desired position and its current position, and adjust the phase of the local oscillator signal accordingly.

Figure 3:
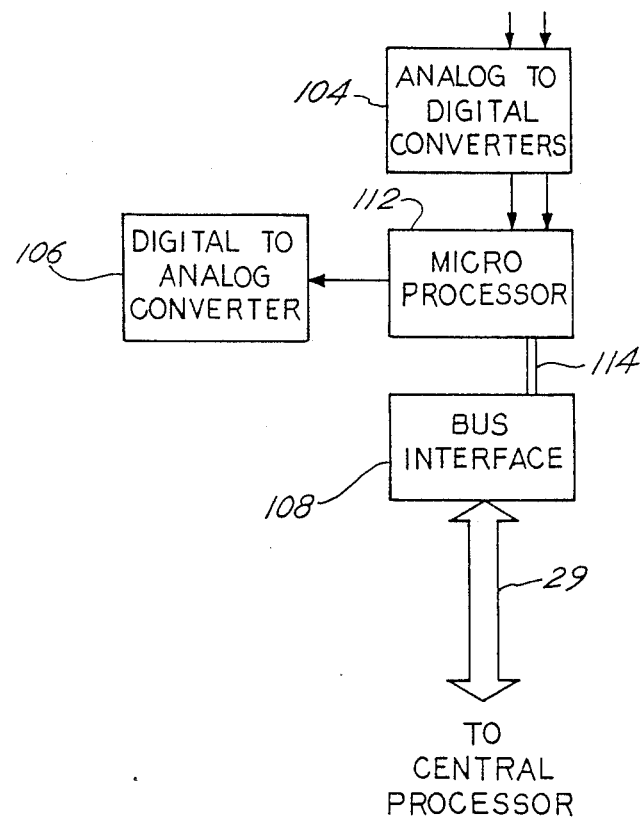
FIG. 3 is a block diagram of an alternative form of a portion of the optical receiver unit shown in FIG. 2.

A portion of a preferred form of sensor unit for a distributed system is shown in FIG. 3. The sensor is identical to the one shown in FIG. 2, except that a microprocessor 112 is added as shown to store the x,y position of the sensor in the array and to calculate the adjustment needed for the phase of the local oscillator signal. Microprocessor 112 receives data from bus interface 108 through a conventional control bus 114. Placing a microprocessor in each sensor is an important feature that enables the phase adjustment to be carried out in minimal time and with minimal communication bus contentions. For some applications, such speed may be essential.

Alternatively, in a centralized system, the processor 22 may perform the error calculation sequentially for each of the receivers in the array 18, and supply each with a final phase adjustment value. In either case, the error calculation is a simple scaler arithmetic operation involving the evaluation of a polynomial and the subtraction of this number from the determined position. Since the error value is invariant wavelength to wavelength in the direction of light travel, high dynamic range is not required in any of the data or processing.

This error signal is employed by the optical receiver (which either calculated its magnitude, or was supplied with its magnitude from the central processor 22) to update its position via the use of the D/A converter 106 and the phase shifter 74 seen in FIG. 2. Each optical receiver performs such a phase adjustment of its effective relative position independently of all the other receivers. When each receiver contains its own local processor, the only exchange of information is the one way transfer of the relative phase angle of the master receiver and information concerning the figure data (i.e., pointing and focusing information) coming from the central processor 22.

This technique is a significant simplification over prior art techniques, principally due to the repetitive (wavelength to wavelength) character of the phase information being extracted by the receivers, and also due to the modular design of the receivers.

Attention will now be turned from the topic of figure control to that of beam steering. In prior systems, pointing of the sensor field of view (FOV) involves mechanical action. This is usually accomplished by the use of pointing mirrors or physically turning the optical system to point at the required FOV. In accordance with an important feature of the present invention, the electronically controllable optical phase shift elements in the receivers provide a mechanism for adjusting the viewing angle of the system.

The beam steering methods employed in the present invention are, in some respects, similar to those used in phase array radar systems; however, there are significant differences, including the wavelength of operation, the spacing of the receivers, and the receive-only mode of operation used in the present invention. These differences may be explained as follows:

In general, an array of laser transmitters can be modelled as a diffraction grating, or a grating array can be modelled as an array of laser transmitters. In a grating array, each slit is modelled as a source of coherent radiation. The phase relationship from one slit to the next is a function of either the incident backside illumination, or equivalently, the relative phase shifts between the phase fronts emitted at each of the slits or transmitters. These phase relationships determine the angular position of the diffraction pattern relative to the position of the grating. Optical theory predicts that this pattern can be shifted, or steered, by changing the relative phase of the emitted radiation across the array of slits or transmitters.

The above statements were made in reference to a transmissive system. By reciprocity, the same concepts also apply to an array which only receives electromagnetic energy. In this case, the diffraction pattern represents the sensitivity pattern for the array of receivers. A target illuminated in a lobe of this pattern can be imaged by this optical array of sensors. Targets neither in a receive lobe nor illuminated are not imaged. A target not in a receive lobe can be imaged by introducing a phase shift that causes the receive field pattern to be shifted such that the target is contained in a receive lobe. When this target is illuminated by a laser illuminator, the reflected radiation pattern can be coherently combined by the receive array. Those targets not in a receive lobe are not imaged, independent of whether or not they are illuminated. By appropriately controlling the phase shift each receiver in the two dimensional array implements, the receive pattern can be shifted or steered in two dimensions.

Multiple targets that may be both (1) illuminated and (2) in the receive lobe of the receive aperture can be distinguished via a concept denoted "focusing," or by use of range gating techniques. Range gating is based on timing the return of various signals from multiple sources and only collecting and processing the signals over those time intervals corresponding to the targets of interest.

As a result of the sensor geometry, i.e., the angle between the illuminator and the receive aperture, targets at different ranges must be in different receive lobes. The array can be forced to focus in a manner quite similar to that used in a typical telescope to discriminate between these targets at different ranges. Note that, since the targets are not strictly in the far field, there exists a certain amount of curvature in the reflected phase fronts across the receive aperture. This phase front curvature is classically described in optical theory by the relationship between Fresnel and Fraunhofer diffraction. The phase curvature across the full receive aperture is a function of the distance, or range to the target. Since no two illuminated targets can be at the same range and in receive lobes, their will exist a difference in phase front curvature between illuminated target complexes in different receive lobes. By adjusting the phase shift elements 74 (see FIG. 2) in each of the optical receivers, an arbitrary degree of synthetic curvature can be introduced across the array of receivers. This will have the effect of focusing the array to a specific range and consequently, to a particular target. Range to the target (determined via a variety of known techniques) is supplied to the system from the source 28 seen in FIG. 1. Focusing will cause any data received concerning the alternate target to be decorrelated and as a result appear as background noise.

As discussed next, the signal to noise ratio of the imaging data and/or a greater FOV may be obtained by illuminating the target with laser pulses at varying wavelengths.

In the above description, the laser is assumed to transmit a single pulse or a series of pulses at the same wavelength. The spatial structure of the reflected radiation field represents the diffraction pattern of the scene that was illuminated. Each optical receiver in the array is at a stationary position relative to the target and illuminator and generates a single measurement of the reflected radiation field. Use of multiple pulses at the same wavelength will only add redundancy to these measurements and/or increase the effective signal to noise ratio of the data.

The spatial structure of this reflected radiation field is a function of scene structure. The scale of this field is a function of the distance to the scene and wavelength of illumination. Assuming a constant range to the target, the scale or size of this field can be controlled by changing the wavelength of illumination. A consequence of this observation is that a single receiver, whose position is fixed, can be employed to collect multiple spatially separated samples of the reflected radiation field. By careful control of the wavelength of illumination, and the manner in which the data is collected and formatted, a single array of receivers can be employed to generate significantly more spatial samples than there are receivers.

The purpose of this technique is twofold. First, it increases the diversity of measurement and improves the effective signal to noise ratio and the confidence in the data. Secondly, as noted earlier, this technique can be employed to substantially effect the field of view (FOV) of the sensor system. The maximum physical extent over which this array of optical receivers collect information from the reflected radiation field determines the angular resolution this optical system is capable of providing.

The density at which this array of optical receivers collect samples of the reflected radiation field determines the static field of view, FOV, of the system. Some applications may dictate a system static FOV that may require a sufficiently dense packing of optical receivers such that the optical collecting area for each optical receiver is too small to be practical. Note that as the density of the optical receivers increase, there is a necessary reduction in the maximum size of each receiver. A solution to this problem is to devise a technique by which a single optical receiver can generate the data collected by a larger number of closely spaced optical receivers. This can be accomplished in one of two ways.

In the first method, the laser illuminator is controlled (by the central processor 22) to transmit at a series of discrete wavelengths. The laser transmits a pulse of radiation at one wavelength, then a pulse at a second wavelength, and so forth until pulses of constant wavelength radiation have been transmitted at, for example, eight discrete wavelengths. These pulses need not necessarily be equally spaced in frequency or of exactly equal amplitude or of the same duration. Each of the receivers in the array collects and processes the reflected radiation pulses sequentially in step with the transmitter. During the time period when reflected laser pulse at the first wavelength is passing by the sampling aperture, diffraction data regarding the target structure at the first wavelength is collected and processed. All of the receive apertures perform the same process for all of the transmitted pulses.

After all this data is collected, appropriately reformatted to account for the effective increase in Fourier samples, the central processing unit performs a Fourier inversion algorithm to generate an image of the target. In this manner each of the optical receivers generate the data that many (in this case, eight) closely spaced optical receivers would collect and generate. This effectively increases the sampling density of the full aperture, and consequently, increases the FOV of the system without reducing the size of the optical collection area of each receiver.

In the case of each receiver generating the data that eight closely packed optical receivers could supply, the FOV would be increased by approximately a factor of 8, meaning that 64 times the area could viewed at once while maintaining full resolution.

In the complete sampled optical aperture system, data must be collected in two dimensions; consequently, the density increase must be realized in two-dimensions if the FOV is to be increased. A natural sampling format that allows a two-dimensional increase in density via a one-dimensional process is a polar sampling format. Arranging the optical receivers in the array in a polar format over the full aperture, as opposed to a rectilinear format, illustrated in FIG. 1, allows the use of the frequency shifting concept to increase the effective number of receivers in two dimensions in a format that is readily processed.

A Fourier inversion technique applicable to this sampling format is known as convolutional back-projection. Fourier conversion via convolutional back-projection is more generally discussed by G. T. Herman in *Image Reconstruction From Projections, The Fundamentals of Computerized Tomography.*

The second method of increasing the static FOV makes use of the enhanced beam agility provided by the invention. The basic technique employed for steering the receive lobe or static FOV over large angles, as discussed above, is simply modified to slew the static FOV over small angles. By stepping the static FOV over the region of interest, a larger dynamic FOV can be synthesized.

As the receive lobe is steered, the illuminator can work in one of two distinct manners: In the first case, the laser illuminates the entire field over which the static FOV will be slewed. In the second case, the laser is pulsed and re-aligned to the new portion of the dynamic FOV into which the receiver is steered.

This process of slewing the sensor footprint through small angles to synthesize a larger dynamic FOV can he performed with or without overlap between the static FOV's. An advantage of this technique is that larger sub-aperture receivers can be employed, which allows either lower power illuminators and/or less dwell time at each position. The end result is that a larger system FOV can be obtained with lower number of sub-aperture receivers without a necessary penalty on the laser illuminator.

Figure 4:
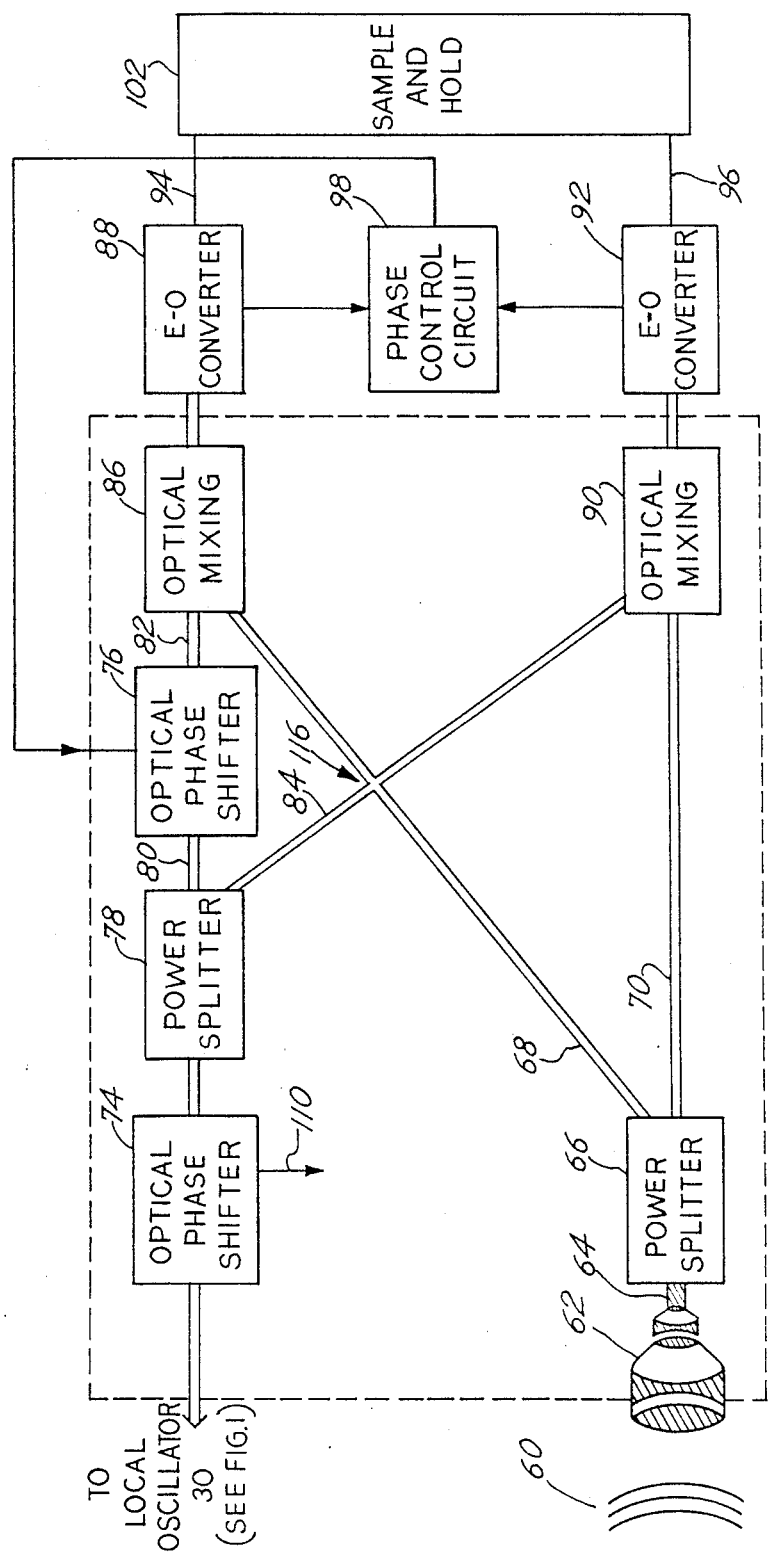
FIG. 4 is a block diagram of an alternative form of another portion of the optical receiver unit shown in FIG. 2.

FIG. 4 illustrates another embodiment suitable for use when the power splitters, optical mixing devices, and optical phase shifters are implemented on a single monolithic substrate. The components of FIG. 4 can be understood from the explanation of like-numbered components shown in FIG. 2. Preferably, the substrate comprises lithium niobate; however, other materials could be employed. Like-numbered output channels shown in FIG. 2 are constructed in the substrate as waveguides arranged as shown in FIG. 3. Waveguides 68 and 84 form an integral junction 116 such that there is substantially no leakage of the signal in guide 68 into guide 84 and substantially no leakage of the signal in guide 84 into guide 68. Due to the limited curvature of waveguides available in monolithic optical integrated circuits, including those made from lithium niobate, this is an important feature that minimizes the number of optical fibers that need to be connected to the substrate. The embodiment of FIG. 4 can use the same analog to digital converters, digital to analog converters, bus interference or microprocessor as shown in FIGS. 2 or 3. As a result, these components are not shown in FIG. 4.

SYSTEM OPERATION

Operation of this system begins with the continual referencing of the array of optical receivers 18 by beacon 33 that emits optical radiation at a known range from the array and of a known spectral content. Beacon 33 may be a laser, a star or other well defined source, and is assumed to be sufficiently small as to be modelled as a point source or other well known structure. The radiated field's phase structure of beacon 33 across the array of optical receivers 18 is consequently well known. One of the receivers in array 18 is selected as the master optical receiver and determines from the beacon 33 reference field a reference point which is transmitted to all the remaining slave optical receivers. This reference point is used by each of the slave optical receivers to determine its position in the reference field of beacon 33.

The relative phase position of each slave optical receiver in the beacon 33 reference field is then determined by comparing the quadrature signals generated by each receiver with the signals which would be expected if that receiver had the proper phase relationship to the master optical receiver. The comparison result in an error signal that may be produced locally at each receiver in a distributed processing system, or may be centrally calculated at central processor 22, which then returns the error value to each receiver via main bus 29. In either case, the calculated phase correction is applied to optical phase shift device 74 in each receiver to place the array of optical receivers in relative coherence.

This process occurs continuously and in real-time. In a distributed system, each receiver may update is relative position at a rate in excess of several hundred thousand times each second. If deemed necessary, this could be performed at a significantly higher or lower rate.

A background process to all functions is the continual operation in which each of the receivers maintain internal quadrature performance. This is accomplished by the electronics associated with each of the optical receivers, one possible implementation of which is represented by the phase control circuit 98 and optical phase shifter 76 seen in FIG. 2 which together maintain the quadrature relationship of the baseband signals appearing on leads 94 and 96 in each receiver module.

The range and angular position of a target is provided to the CPU 22. The CPU calculates the phase shift parameters needed to cause an array receive lobe to fall on the target and calculates the appropriate aperture curvature to focus the array on the target at the specified range. The data are transferred to the array of optical receivers which appropriately update their operating parameters to slew the receive beam onto the target and to focus at the appropriate range. These updated operating parameters are employed to modify the calculations used to phase the array of receivers.

At a selected time, the laser target illuminator 10 transmits a pulse or train of pulses of radiation at a specified wavelength. During the round trip propagation time for the illumination signal, the receive array continues to reference against beacon 33. Shortly before the reflected target illumination pulse(s) is scheduled to arrive at the receive array, the array slews the receive pattern and focuses onto the illuminated target, and slews beacon 33 into a null lobe and/or defocuses.

As the reflected radiation from the target 14 passes by receive array 18, each receiver collects light energy from which relative phase information concerning the diffraction pattern of the target is generated. This twodimensional, complex information set is generated by coherently demodulating the incident phase front across all of the receive apertures (e.g., lens 62) concurrently and in parallel. Since all of the receive apertures are assumed to be coherently aligned (to the appropriate phase value in the operative wavelength), the information represented by the electric signals on leads 94 and 96 in each receiver represent accurate phase information concerning the diffraction pattern across the face of the full collection aperture (i.e., array 18).

The quadrature data from which phase information is derived can also be employed in a well known manner to generate magnitude information regarding the diffraction pattern. This data can be also be employed for image generation.

As noted earlier, in some implementations of this invention, it may be necessary or desirable to employ multiple illumination pulses at various wavelengths to effect an increase in the FOV of the system. For this case, after laser 10 has transmitted at a first wavelength, laser 10 turns off, shifts to a second wavelength, and generates a second pulse of constant wavelength radiation, at the second wavelength. The signal from local oscillator 30 is also shifted to this new wavelength to insure appropriate demodulation. All pulses do not necessarily need to be of the same duration or amplitude.

The array of optical receivers collect the reflected optical signal and after demodulation and detection, generate phase information concerning target 14 at a slightly shifted set of spatial frequencies. This process is repeated until laser 10 has transmitted at all of the selected wavelengths. The data collected by the receivers is transferred to the CPU for processing.

Alternatively, the FOV may be increased by quickly steering the lobe pattern by small steps, each step being on the order of the size of the static FOV of array 18. The laser may be left on during the entire period of time during which the lobe pattern is slewed or it may be turned on only after the lobe pattern has been shifted.

For the case of a single pulse of illumination, the received data is processed by a Fourier inversion algorithm to generate an image of the target. In the case of multiple illumination pulses or phase shifting, the data is reformatted by the CPU and properly interpolated to provide data in an appropriate format for the Fourier invention technique employed.

In the case of moving targets which impose a Doppler shift on the returned wavelength, local oscillator 30 may be frequency locked to the return pulse to ensure that the collected signal is demodulated down to baseband.

CONCLUSION

It is to be understood that the specific arrangements which have been described are merely illustrative applications of the principles of the present invention. Numerous modifications may be made to the apparatus and methods disclosed above without departing from the true spirit and scope of the invention.

What is claimed is:

1. An imaging system for producing an image of a target comprising, in combination a local oscillator for producing an optical local oscillator signal, an array of spatially separated optical sensors, means in each of said sensors responsive to an incoming light energy wavefront for generating a phase-related signal indicative of the phase and magnitude of said wavefront relative to said local oscillator signal, means for illuminating all of said sensors with a light energy calibration wavefront having a known phase at the location of each of said sensors, means for adjusting the phase of said local oscillator signal at each sensor to a prescribed phase-displacement with respect to said calibration wavefront, a coherent light source for illuminating a target with coherent light, means for deriving sample values of phase-related signals generated by each of said sensors in response to said coherent light reflected from said target, and means for processing said sample values to form an image of said target.

2. The imaging system set forth in claim 1 further including, in combination, means for generating an aiming signal designating the angular location of said target relative to said array, and means responsive to said aiming signal for shifting said prescribed phase-displacement for at least selected ones of said sensors to steer a lobe of array sensitivity in the direction indicated by said aiming signal.

3. The imaging system as set forth in claim 1 or 2 further including, in combination, means for generating a range signal designating the distance of said target from said array, and means responsive to said range signal for shifting said prescribed phase-displacement in at least selected ones of said sensors to focus the lobe of maximum array sensitivity at the range specified by said range signal.

4. The imaging system set forth in claim 1 or 2 wherein said coherent light source produce a sequence of light energy impulses of differing wavelengths to produce a corresponding sequence of dignal data which is processed to form an image of said target.

5. Apparatus for forming a visual image of a target object which comprises, in combination, a monochromatic light source for illuminating said target object, a source of a local oscillator signal having a predetermined wavelength relationship with respect to the light from said monochromatic light source, a central processor, an array of light energy receivers, each of which is connected to said central processor and each of which comprises, in combination, a lens for collecting light energy from said monochromatic light source which is reflected from said object, an optical power splitter for dividing the energy collected by said lens into first and second optical reception signals, means for optically mixing said first reception signal with said local oscillator signal to form a first baseband signal, means for optical mixing said second reception signal with said local oscillator signal to form a second baseband signal, a first controlled phase shifting means for establishing a predetermined phase shifted relationship between said first baseband signal and said second baseband signal, first data storage means for storing a variable, a second controlled phase shifting means for shifting the phase of said local oscillator signal in response to the magnitude of said variable, means for producing output data indicative of the phase of said baseband signals relative to said local oscillator signal, and interface means for transmitting said variable from said central processor to said data storage means and for transmitting said output data to said central processor, whereby said central processor is provided with data suitable for processing into said visual image by performing a Fourier inversion algorithm.

6. Apparatus as set forth in claim 5 further including a phase control circuit having first and second inputs connected to receive said and second baseband signals and an output connected to control said first controlled phase shifting means.

7. Apparatus as set forth in claim 5 further including, in combination, means coupled to said central processor for generating data indicative of a desired direction and a desired range relative to said array, means for generating desired figure data including a correction value for each receiver in said array, and means for storing the correction value for each of said receivers in said first data storage location such that the relative phase of all of said receivers is adjusted to direct the sensitivity lobe of said array in said desired direction and focus said lobe at said desired range.

8. Apparatus as set forth in claim 7 further including means for generating a sequence of varying aiming commands and for transmitting said commands to said interface means whereby the sensitivity lobe is scanned across an enlarged field of view for said visual image.

9. Apparatus as set forth in claim 5, 6 or 7 wherein said monochromatic light source produces a sequence of light energy pulses of differing wavelengths to produce a corresponding sequence of output data from said receivers which is processed by said central processors.

10. Apparatus as set forth in claim 1, wherein the array of sensors comprises a reference sensor and a plurality of slave sensors and wherein the means for adjusting comprises:

a data bus interconnecting the sensors;

means for transmitting on the data bus a phase reference signal indicating the relative phase of the calibration wavefront received at the reference sensors; and means in the slave sensors for calculating the proper phase of the local oscillator signals in the slave sensors.

11. In a system for forming a visual image of a target object by use of a monochromatic light source that illuminates said target object, an improved array of light energy receivers for generating signals indicative of the phase relaptionship between the monochromatic light reflected from the target object and a light oscillator signal having a predetermined wavelength with respect to the light from said monochromatic light source, each energy receiver comprising in combination:

means for receiving said light oscillator signal, a lens for collecting light energy from said monochromatic light source which is reflected from said object, an optical power splitter for dividing the energy collected by said lens into first and second optical reception signals, means for optically mixing said first reception signal with said light oscillator signal to form a first baseband signal, means for optically mixing said second reception signal with said light oscillator signal to form a second baseband signal, a first controlled phase shifting means for establishing a predetermined phase shifting relationship between said first baseband signal and said second baseband signal, first data storage means for storing a variable, a second controlled phase shifting means for shifting the phase of said light oscillator signal in response to the magnitude of said variable, and means for producing output data indicative of the phase of said baseband signals relative to said local oscillator signal, whereby the system is provided with data suitable for processing into said visual image.

12. Apparatus as set forth in claim 11 further including a phase control circuit having first and second inputs connected to receive said first and second baseband signals and an output connected to control said first controlled phase shifting means.

13. Apparatus, as set forth in claim 5 or 11, wherein the predeteremined phase shifted relationship is substantially 90 degrees.

14. In a system for forming a visual image of a target object by use of a monochromatic light source that illuminates said target object, an improved array of light energy receives for generating signals indicative of the phase relationship between the monochromatic light reflected from the target object and a light oscillator signal having a predetermined wavelength with respect to the light from said monochromatic light source, each energy receiver comprising in combination:

means for receiving said light oscillator signal, a lens for collecting light energy from said monochromatic light source which is reflected from said object, a monolithic substrate integrally forming a first optical power splitter for dividing the energy collected by said lens into first and second optical signals, a second optical power splitter for dividing energy from said light oscillator signal into third and fourth optical signals, first mixer means responsive to the first and third optical signals for optically mixing said frist optical with energy from said light oscillator signal to form a first baseband signal, second mixer means responsive to said second and fourth optical signals for optically mixing said second optical signal with energy from said light oscillator signal to form a second baseband signal, a first waveguide for trasmitting the first optical signal between the first optical power splitter and the first mixer means, a second waveguide for transmitting the second optical signal between the first optical power splitter and the second mixer means, a third waveguide for transmitting the third optical signal between the second optical power splitter and the first mixer means, the second and third waveguides forming an integral junction such that there is substantilly no leakage of the second optical signal into the third waveguide and substantially no leakage of the third optical signal into the second waveguide, and means for producing output data indicative of the phase of said baseband signals relative to said light oscillator signal, whereby said system is provided with data suitable for processing into said visual image.

15. In an imaging system for producing an image of a target, improved apparatus comprising, in combination:

a local oscillator for producing an optical light oscillator signal, an array of spatially separated optical sensors, including a reference sensor and slave sensors, a data bus for interconnecting the reference sensor and slave sensors, means in each of said sensors responsive to an incoming light energy wavefront for generating a phase-related signal indicative of the phase and magnitude of said wavefront relative to said light oscillator signal.

means for illuminating all of said sensors with a light energy calibration wavefront having a known phase at the location of each of said sensors.

means in the reference sensor for transmitting on the data bus a phase signal indicating the relative phase of the calibration wavefront received at the reference sensor, means for adjusting the phase of the said light oscillator signal at each slave sensor to a prescribed phase-displacement with respect to said calibration wavefront, said means for adjusting including a microprocessor in each slave sensor, a coherent light source for illuminating a target with coherent light, and means for deriving sample values of the phase-related signals generated by each of said sensors in response to the coherent light reflected from said target, whereby the sample values may be processed to form an image of said target.

16. A method of producing an image of a target by use of an array of spatially separated optical sensors and a coherent light source for illuminating said target with coherent light comprising, in combination, the steps of:

producing an optical local oscillator signal, generating in response to an incoming light energy wavefront a phase-related signal indicative of the phase and magnitude of said wavefront relative to said local oscillator signal, illuminating all of said sensors with a light energy calibration wavefront having a known phase at the location of each of said sensors, adjusting the phase of the said local oscillaor signal at each sensor to a prescribed phase-displacement with respect to said calibration wavefront, deriving sample values of phase-related signals generated by each of said sensors in response to said coherent light reflected from said target, and processing said sample values to form an image of said target.

17. The method set forth in claim 16 further including, in combination, the steps of:

generating an aiming signal designating the angular location of said target relative to said array, and shifting in response to said aiming signal said prescribed phasedisplacement for at least selected ones of said sensors to steer a lobe of array sensitivity in the direction indicated by said aiming signal.

18. The method set forth in claims 16 or 17 further including, in combination, the steps of:

generating a range signal designating the distance of said target from said array, and shifting in response to said range signal said prescribed phasedisplacement in at least selected ones of said sensors to focus the lobe of maximum array sensitivity at the range specified by said range signal.

19. The method set forth in claims 16 or 17 further including the step of energinzing said coherent light source to produce a sequence of light energy impulses of differing wavelengths to produce a corresponding sequence of digital data which is processed to form an image of said target.

20. A method of forming a visual image of a target object by use of a central processor responsive to an array of light energy receives, said method comprising, in combination, the steps of:

illumination said target object with a monochromatic light source, generating an optical local oscillator signal having a predetermined wavelength relationship with respect to the light from said monochromatic light source, at each of said receives performing the steps of collecting light energy from said monchromatic light source which is reflected from said object.

dividing the energy collected into first and second optical reception signals, optically mixing said first reception signal with said local oscillator signal to form a first baseband signal, optically mixing said second reception signal with said local oscillator signal to form a second baseband signal, establishing a predetermined phase shifted relationship between said first baseband signal and said second baseband signal, storing a variable, shifting the phase of said local oscillator signal in response to the magntitude of said variable, producing output data indicative of the phase of said baseband signals relative to said local oscillator signal, and transmitting said variable from said central processor to a data storage means and transmitting said output data to said central processor, whereby said central processor is provided with data suitable for processing into said visual image by performing a Fourier inversion algorithm.

21. The method as set forth in claim 20 further including the steps of receiving said first and second baseband signals and generating an output used in said step of establishing a predetermined phase relationship.

22. The method as set forth in claim 20 further including, in combination, the steps of:
gererating data indicative of a desired direction and a desired range relative to said array,
generating desired figure data including a correction value for each receiver in said array, and
storing the correction value for each of said receivers such that the relative phase of all of said receivers is adjusted to direct the sensitivity lobe of said array in said desired direction and focus said lobe at said desired range.

23. The method as set forth in claim 22 further including the steps of generating a sequence of varying aiming commands and transmitting said commands whereby the sensitivity lobe is scanned across an enlarged field of view of said visual image.

24. The method as set forth in claims 20, 21 or 22 further comprising the step of energizing said monochromatic light source to generate a sequence of light energy pulses of differing wavelengths to produce a corresponding sequence of output data from said receivers which is processed by said central processor.

25. The method as set forth in claim 16 wherein the array of sensors comprises a reference sensor and a plurality of slave sensors and wherein the step of of adjusting comprises:
interconnecting the sensors with a data bus,
transmitting on the data bus a phase reference signal indicating the relative phase of the calibration wavefront received at the reference sensors, and
calculating in the slave sensors the proper phase of the local oscillator signals in the slave sensors.

26. In a system for forming a visual image of a target object by use of a monochromatic light source that illuminates said target object, an improved method of generating signals indicative of the phase relationship between the monochromatic light reflected from the target object and a light oscillator signal having a predetermined wavelength with respect to the light from said monochromatic light source comprising, in combination, the steps of:
collecting light energy from said monchromatic light source which is reflected from said object,
dividing the energy collected into first and second optical reception signals,
optically mixing said first reception signal with said light oscillator signal to form a first baseband signal,
optically mixing said second reception signal with said light oscillator signal to form a second baseband signal,
establishing a predetermined phase shifted relationship between said first baseband signal and said second baseband signal,
storing a variable,
shifting the phase of said light oscillator signal in response to the magnitude of said variable, and
producing output data indicative of the phase of said baseband signals relative to said local oscillator signal,
whereby the system is provided with data suitable for processing into said visual image.

27. The method as set forth in claim 26 further including the steps of receiving said first and second baseband signals and generating an output to control said step of establishing a predetermined phase shifted relationship.

28. A method for producing an image of a target by use of an array of spatially separated optical sensors, including a reference sensor and slave sensors, a data bus for interconnecting the reference sensor and slave sensors, and a microprocessor in each slave sensor, said method comprising, in combination, the steps of:
producing an optical light oscillator signal,
generating in each of said sensors in response to an incoming light energy wavefront a phase-related signal indicative of the phase and magnitude of said wavefront relative to said light oscillator signal,
illuminating all of said sensors with a light energy calibration wavefront having a known phase at the location of each of said sensors,
generating in the reference sensor and transmitting on the data bus a phase signal indicating the relative phase of the calibration wavefront received at the reference sensor,
adjusting with said microprocessors the phase of the said light oscillator signal at each slave sensor to a prescribed phase-displacement with respect to said calibration wavefront,
illuminating said target with coherent light, and
deriving sample values of the phase-related signals generated by each of said sensors in response to the coherent light reflected from said target, whereby the sample values may be processed to form an image of said target.

29. The method as claimed in claims 20 or 26 wherein the predetermined phase shifted reltionship is substantially 90 degrees.

* * * * *